UNITED STATES PATENT OFFICE.

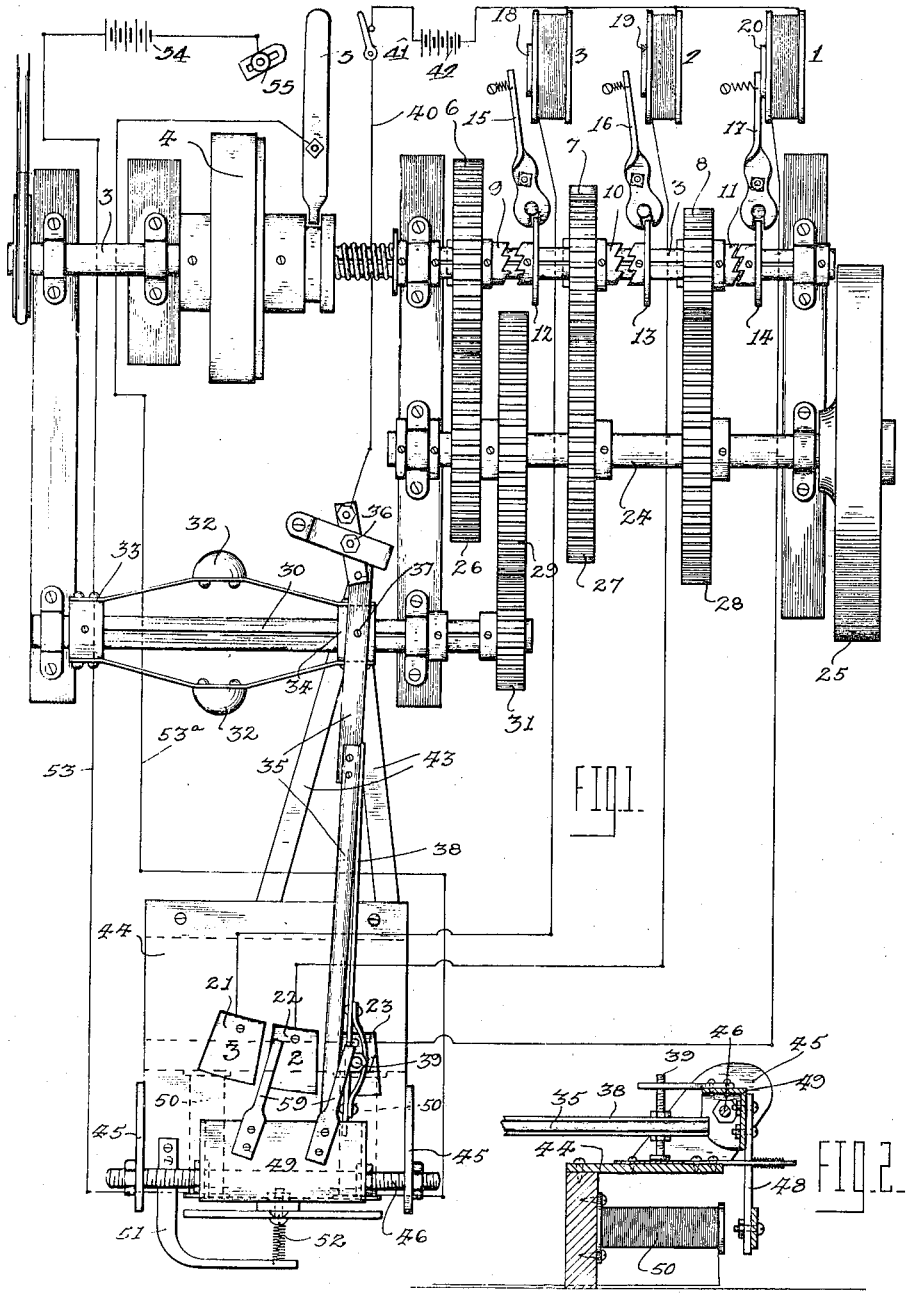

REGINALD G. MULKINS, OF OTTAWA, ONTARIO, CANADA.

SPEED-CHANGING MECHANISM.

1,252,476.   Specification of Letters Patent.   Patented Jan. 8, 1918.

Application filed November 10, 1916.   Serial No. 130,596.

*To all whom it may concern:*

Be it known that I, REGINALD G. MULKINS, a citizen of the Dominion of Canada, residing at Ottawa, in the county of Carleton and Province of Ontario, have invented certain new and useful Improvements in Speed-Changing Mechanism, of which the following is a specification.

This invention relates to speed changing mechanism and it is particularly adapted to be used in connection with automobile driving means.

It consists of a means for operating the different speeds from the clutch by the use of magnets.

A further object is in the arrangement whereby high speed cannot be put on until the mechanism is running at or near high speed.

In the drawings; Figure 1 shows a top plan view of my invention.

Fig. 2 shows an end section view of the controlling device.

Referring particularly to the accompanying drawings, 3 indicates a shaft on which the clutch 4 is mounted. Clutch 4 may be of any desired type and having an operating lever 5. Mounted on shaft 3 are three gear wheels 6, 7 and 8. These are so mounted that the shaft can turn without operating any of these wheels. Each wheel 6, 7 and 8 has a dog wheel side flange 9, 10, and 11 respectively. 12, 13 and 14 are dog wheels slidably mounted on the shaft 3 and always turning with the same. These dog wheels 12, 13 and 14 are operated by keys 15, 16 and 17 respectively. These keys are pivotally mounted, and their free ends are adapted to be attracted by the magnets 18, 19 and 20 respectively. These magnets 18, 19, and 20 are connected to plates 21, 22 and 23 respectively.

24 is a second shaft pivotally mounted and carrying a fly wheel 25 and gear wheels 26, 27 and 28, the latter three meshing with the geared wheels 6, 7 and 8 respectively. 29 is a further geared wheel mounted on shaft 24.

30 is a further shaft suitably mounted and carrying a geared wheel 31 adapted to mesh with the geared wheel 29. 32 are a pair of weights which are respectively attached to leaf springs. The leaf springs have one of their ends securely fastened to a fixed collar 33 on the shafting 30 and their other ends fastened to a slidable collar 34 mounted on said shaft. 35 is a bar pivotally mounted at 36 and hingedly connected at 37 with the collar 34. 38 is a flat spring secured at its inner end to the bar 35, and its outer free end carries an engagement pin 39 which is adapted to slide on the plates 21, 22 and 23. The circuit between the magnets 18, 19 and 20, and the plates 21, 22 and 23 is completed through the bar 35 and wiring 40. 41 is a switch and 42 is a set of batteries. 43 are a set of arms which are pivotally mounted at 36 and hold the frame 44 on which the plates 21, 22 and 23 are situated. This frame 44 can be moved on its pivot as desired.

At the end of the frame 44, two side plates 45 are secured and carry a pin 46 between them. 47, 48 are two flat, metallic members connected together by an L shaped member 49 and securely mounted on the pin 46. 50 indicates a pair of magnets situated so as to attract the free end of member 48 so as to act against the magnet 50. 53 is a circuit extending through the batteries 54 and the connection block 55. The other part 53ª of the same circuit extends back to the clutch lever 5 so that the connection is made when the clutch lever 5 is pressed forward into contact with the connection block 55.

Having described the different parts of my invention, I will now describe its operation in connection with an automobile, although this same mechanism can be used wherever the changing of speed is desired. First throwing the switch 41 and start the shaft 24 turning. When this shaft 24 gets going it will cause the weights 32 to expand and thus pulling over the bar 35 until it comes over plate 23, and the connection pin 39 makes a connection through the magnet 20. This magnet 20 attracts the free end of the key 17, which in turn engages the dog wheel 14 with the flange 11, and thus low speed is commenced. When this gets going for a while, the governors will expand more and will be pulling on the bar 35, but the connection pin 39 cannot swing over to plate 22 until the clutch lever 5 is pushed into connection with the connection block 55, thus raising the fingers 59 and allowing the engagement pin 39 to swing under. There is now a connection through plate 22 thus operating the magnet 19 and freeing the magnet 20. Intermediate speed is now connected similar to low speed. When the automobile is going faster, high speed is put on in the same way. Slowing down can be done by the same operation of the clutch lever 5.

The frame 44 will have to be set according to the weight of the car and power of the engine. Where it is a heavy load, the frame 44 is fixed so that the collar 34 will not pull the bar 35 over the plate 23 in a shorter time as if it was operated on a light automobile.

From the foregoing it is thought that the construction of my invention will be clearly understood, and therefore a more extended explanation has been omitted.

What I claim as new, is—

A speed changing mechanism consisting of two series of graduated gears mounted on separate shafts and adapted to mesh in pairs, one series of gears having lateral clutch members, clutch members mounted on one of said shafts adapted to engage said lateral clutch members on said gears, a governing mechanism, a bar operated by said governing mechanism, plates mounted on a frame, a flat spring connected to said bar and carrying a connection pin at its free end adapted to slide over said plates, a series of magnets each connected to one of said plates, keys pivotally mounted to be attracted by said magnets and adapted to throw said clutch members into engagement with said lateral clutch members, a set of fingers hingedly mounted on said frame, magnets adapted to raise said fingers, and a connection means to operate said magnet by pressing the clutch lever.

In testimony whereof I affix my signature in the presence of two witnesses.

REGINALD G. MULKINS.

Witnesses:
DONALD B. FISHER.
A. MURRAY GORDON.